United States Patent [19]

Svab et al.

[11] Patent Number: 4,543,852
[45] Date of Patent: Oct. 1, 1985

[54] CLUTCH ASSEMBLY FOR A PLANETARY FORWARD REVERSE GEAR SET

[75] Inventors: Eugen Svab, Cologne, Fed. Rep. of Germany; Petrus H. van Deursen, Asten; Theodorus P. M. Cadée, Goirle, both of Netherlands

[73] Assignees: Ford-Werke Aktiengesellschaft; Van Doorne's Transmissie B.V., both of Fed. Rep. of Germany

[21] Appl. No.: 547,857

[22] Filed: Nov. 2, 1983

[30] Foreign Application Priority Data

Nov. 11, 1982 [DE] Fed. Rep. of Germany ....... 3241789

[51] Int. Cl.$^4$ ............................................. F16H 37/08
[52] U.S. Cl. ...................................... 74/695; 74/701; 74/740; 74/788; 74/794
[58] Field of Search ................. 74/689, 694, 695, 701, 74/740, 788, 793, 794, 786, 787

[56] References Cited

U.S. PATENT DOCUMENTS

| 4,317,389 | 3/1982 | Falzoni | 74/740 X |
| 4,342,238 | 8/1982 | Gardner | 74/701 X |
| 4,455,888 | 6/1984 | Wayman et al. | 74/689 |
| 4,467,669 | 8/1984 | Kawamoto | 74/689 X |
| 4,467,670 | 8/1984 | Kawamoto | 74/740 X |

FOREIGN PATENT DOCUMENTS

| 0129953 | 8/1982 | Japan | 74/689 |
| 2093133 | 8/1982 | United Kingdom | 74/740 |

*Primary Examiner*—Leslie A. Braun
*Assistant Examiner*—Joseph M. Rolnicki
*Attorney, Agent, or Firm*—Ratner & Prestia

[57] ABSTRACT

A transmission mechanism in particular for automobiles with a front wheel drive comprises a planetary forward-reverse gear set and a continuously variable pulley drive that is drivingly connected to a differential gearing. A forward friction disk clutch provided for obtaining a forward driving direction of the transmission mechanism may be selectively operated by a servo piston that is fixedly connected in an axially stationary manner to the adjusting piston of a hydraulic adjusting means provided for the selective adjustment of the movable sheave of a primary pulley of said pulley drive whereby the mutual arrangement is chosen in such a manner that the adjusting cylinder being fixedly connected to this movable sheave at least partly surrounds the servo piston. By this particular arrangement the axial dimension of the entire transmission mechanism may be reduced without the requirement of a separate starting clutch for the entire clutch assembly.

8 Claims, 1 Drawing Figure

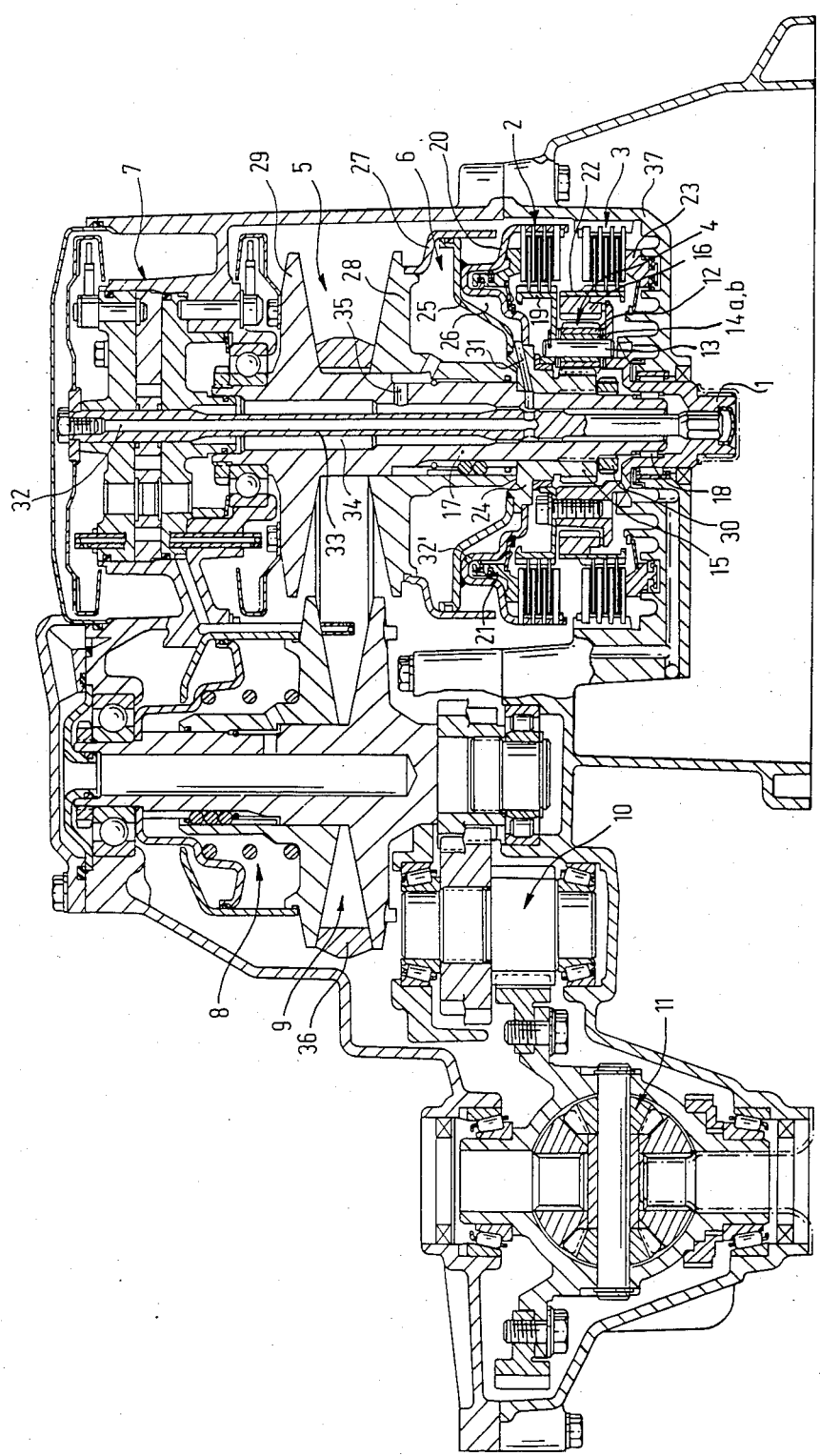

CLUTCH ASSEMBLY FOR A PLANETARY FORWARD REVERSE GEAR SET

FIELD OF THE INVENTION

This invention relates to a clutch assembly for a planetary forward-reverse gear set in a transmission mechanism for vehicles, in particular for automobiles with a front wheel drive.

BACKGROUND ART

A prior art clutch assembly of the kind as herein referred is described in GB Pat. No. 2,093,133. The planetary forward-reverse gear set and the two friction disk assemblies are thereby arranged on the side of the fixed sheave of the primary pulley of the continuously variable pulley drive in such a manner that the servo cylinder of the servo piston provided for the operation of the adjacently arranged forward friction disk clutch is fixedly connected to the rear side of this fixed sheave. The movable sheave of the primary pulley is on the other side provided with an also rearwardly extending cylindric portion serving as an axial guide of this movable sheave within the axially stationary adjusting cylinder of the hydraulic adjusting means the adjusting piston of which is being supported by a secondary member of the adjusting piston that also axially guides the cylindric portion of the movable sheave. In this known clutch assembly relative large axial and radial dimensions are therefore predominant which receive an even greater enlargement by the provision also of a separate starting clutch means having the form of a hydraulic torque converter as also arranged on the side of the fixed sheave forwardly of the planetary gear set and the two friction disk clutches.

In a similar known clutch assembly as described in U.S. Pat. No. 4,342,238 the planetary gear set and the two friction disk assemblies are arranged on the side of the movable sheave of the primary pulley of the continuously variable pulley drive at a position rearward of its hydraulic adjusting means. The adjusting piston of the hydraulic adjusting means is thereby fixedly connected to the rear side of the movable sheave in such a manner that the axially stationary adjusting cylinder receives an arrangement adjacent to an insert body of the transmission housing which insert body is supported by a hub portion of the pinion carrier of the planetary gear set and is provided with a rearwardly extending cylindric portion serving as the servo cylinder for the servo piston provided for the operation of the adjacently arranged reverse friction disk brake. The servo piston provided for the operation of the forward friction disk clutch is arranged still further rearwardly on the axially outermost position of the planetary gear set axially opposite to the position of the hydraulic adjusting means. This known clutch assembly is therefore also provided with relatively large axial and radial dimensions which thereby as well receive a still greater enlargement by the provision also of a separate starting clutch in the form of a hydraulic torque converter being positioned on the side of the fixed sheave at a forward position of the continuously variable pulley drive.

This invention deals with the object of providing a clutch assembly for a planetary forward-reverse gear set suitable for automotive use which allows smaller axial and radial dimensions of the entire transmission mechanism and whereby the clutch assembly may at the same time be designed in such a manner that the automobile may be started with a sensitive feeling independent of a predetermined horse power of the machine and also independent of a predetermined load condition and a predetermined ground condition.

The invention offers the advantages that by the specific structural combination of the servo means provided for the operation of the forward friction disk clutch and the hydraulic adjusting means provided for the adjustment of the primary pulley of the continuously variable pulley drive the axial dimensions of the entire transmission mechanism may be considerably reduced. This structural combination also allows a simplification of manufacturing and installation of the entire transmission mechanism concurrently with a simplified oil feeding system so that with the aid of a suitable control of the oil feeding system for the servo means of the two friction disk assemblies and the hydraulic adjusting means even the provision of a separate starting clutch in the form of a hydraulic torque converter is no longer necessary.

BRIEF DESCRIPTION OF THE DRAWING

The drawing represents a cross-sectional view of a transmission mechanism including the inventive clutch assembly for an automobile with a front wheel drive.

DESCRIPTION OF THE PREFERRED EMBODIMENT

The transmission mechanism as shown in the drawing is provided in its entirety with a very compact structural design with respect to its axial and radial dimensions. The transmission mechanism includes an input shaft 1 that receives a direct drive from an engine the driving shaft of which thereby receives an axially aligned arrangement to this input shaft. The input shaft 1 is connected through a forward friction disk clutch 2 and a reverse friction disk brake 3 to a planetary forward-reverse gear set 4 which by a selective operation of these two friction disk assemblies may be shifted into a forward and a reverse driving direction of the transmission mechanism which further includes a continuously variable pulley drive 5 the primary pulley of which is coaxially arranged with respect to the input shaft 1 and is adjustable by means of a hydraulic adjusting means 6. The input shaft 1 drives an oil pump 7 which is arranged within the transmission housing at the other end of the input shaft and which is accessible for service purposes via a cover lock of the transmission housing. A secondary pulley 9 of the continuously variable pulley drive 5 is provided with a differently designed adjusting means 8 and this secondary pulley provides for the transmission mechanism a second main axis parallel to the input shaft 1 for driving an output gear set 10 which is drivingly connected to a differential gearing 11 through which the axle shaft for driving the front wheels of the automobile are driven. The input shaft 1 is therefore also arranged in parallel to these axle shafts which are arranged in still another main axis of the transmission mechanism.

The input shaft 1 includes an integral pinion carrier 12 of the planetary gear set 4. The planetary carrier 12 carries on bolts 13 intermeshing pinion gears 14a and 14b of which one pinion gear 14a meshes with a sun gear 15 and another pinion gear meshes via the pinion gear 14b with a ring gear 16 of the planetary gear set 4. The sun gear 15 is fixedly connected to a hollow drive shaft 17 provided for the primary pulley of the continuously variable pulley drive 5 whereby this hollow drive shaft 17 is supported on the input shaft 1 by means of a needle roller bearing 18.

The forward and reverse friction disk assemblies 2 and 3 are each provided with a multiple disk arrangement. The forward friction disk clutch 2 includes a first carrier 19 for first friction disks which first carrier is fixedly connected to the pinion carrier 12. It also includes a second carrier for second friction disks which is integral with a servo cylinder 20 housing a servo piston 21 provided for the operation of this forward friction disk clutch 2. When this forward friction disk clutch 2 is operated through the servo piston 21 the pinion carrier 12 will be connected through the one pinion gear 14a and the sun gear 15 to the drive shaft 17 of the continuously variable pulley drive 5 to thereby provide a forward driving direction of the transmission mechanism. The reverse friction disk brake 3 also includes a first carrier 22 for first friction disks which is fixedly connected to the ring gear 16 of the planetary gear set 4. A second carrier for second friction disks is formed by the transmission housing the face wall of which forms a servo cylinder 37 housing a servo piston 23 provided for the operation of this reverse friction disk brake 3. When the servo piston 23 receives a fluid pressure for a selective operation of this reverse friction disk brake the ring gear 16 will then be held stationarily for serving as a reaction member of the planetary gear set 4 so that then the drive shaft 17 of the continuously variable pulley drive 5 will be driven through the intermeshing pinion gear 14b and said other pinion gear 14a meshing with the sun gear 15 in a reverse driving direction of the transmission mechanism.

The servo cylinder 20 is being formed of sheet-metal and is fixedly connected to an enlarged portion of the hub of the sun gear 15 of the planetary gear set 4 whereby this enlarged hub portion provides a shoulder 24 for the primary pulley of the pulley drive. A further sheet-metal piece is also fixedly connected to this enlarged hub portion of the sun gear 15 for providing an adjusting piston 25 of the hydraulic adjusting means 6 for the primary pulley of the pulley drive 5. The adjusting piston 25 is also fixedly connected to the servo cylinder 20 whereby the particular mutual fixation and the particular mutually dependent form of these two members are chosen such that inbetween these two members a hollow space 26 is being provided which forms a portion of the fluid path provided for the hydraulic fluid activating the servo piston 21. The servo cylinder 20 is further surrounded together with the adjusting piston 25 of the hydraulic adjusting means 6 by an adjusting cylinder 27 of this adjusting means which adjusting cylinder 27 is fixedly connected to the rear side of an axially movable sheave 28 of the primary pulley of the pulley drive 5 the second fixed sheave 29 of which is integral with the drive shaft 17. The movable sheave 28 is provided with a hub that is kept in contact with the shoulder 24 provided by the enlarged hub of the sun gear 15 so that thereby the primary pulley of the pulley drive 5 receives a stopping position which by means of an adjusting nut 30 screwed on the drive shaft 17 may be axially adjusted.

The hollow space 26 inbetween the servo cylinder 20 and the adjusting piston 25 is connected through a bore 31 in the hub of the sun gear 15 and in the drive shaft 17 to an intake channel 32 for the hydraulic fluid which intake channel 32 is formed by a hollow drive shaft 33 provided for driving the oil pump 7 and being driven by the input shaft 1. The pump drive shaft 33 is thusly dimensioned and thusly arranged along the axis of the drive shaft 17 of the pulley drive 5 that it also provides a circular space 34 forming a further oil intake channel which via bores 35 of the drive shaft 17 and of the hub of the movable sheave 28 of the primary pulley of the pulley drive 5 is connected to the hydraulic adjusting means 6. When therefore the intake of the hydraulic fluid is properly controlled it will selectively be possible to operate the forward friction disk clutch 2 by feeding oil from the oil intake channel 32 via an opening 32' in the servo cylinder 20 for an actuation of the servo piston 21 or to axially displace the movable sheave 28 of the primary pulley of the pulley drive 5 by feeding oil from this circular space 34 forming a second oil intake channel to thereby achieve a continuously varying transmission ratio by causing a driving belt 36 being arranged for transferring power between the primary and secondary pulleys of the pulley drive 5 to move between a radially inward and radially outward position. Such a controlled admission of the oil is self-understandingly also provided for the servo piston 23 of the reverse friction disk brake 3 in that the servo cylinder 37 is provided with a corresponding intake bore not shown in the drawing. By controlling the intake of the oil to the servo units operating the forward and reverse friction disk assemblies and also to the hydraulic adjusting means for the primary pulley of the pulley drive by controlling means in a well-known manner it will therefore be possible to influence any desired starting of the automobile even without the requirement for a separate starting clutch in the form of a hydraulic torque converter whereby the entire clutch assembly is designed in such a manner that for the entire transmission mechanism a relatively short axial dimension is obtained. The transmission mechanism may therefore be ideally arranged inbetween the two side bars of the frame of an automobile with a front wheel drive.

What is claimed is:

1. A clutch assembly for a planetary forward-reverse gear set in a transmission mechanism for vehicles, in particular for automobiles with a front wheel drive, comprising
    a forward friction disk clutch and a reverse friction disk brake each operated through a servo piston and servo cylinder unit to shift said planetary gear set selectively into a forward and a reverse driving direction of the transmission mechanism,
    a continuously variable pulley drive having a primary pulley, a secondary pulley and a driving belt for transferring power between these two pulleys each of which comprises a fixed sheave and a movable sheave, whereby at least the movable sheave of the primary pulley is adjustable by means of a hydraulic adjusting means comprising an adjusting piston and adjusting cylinder unit with respect to its coordinated fixed sheave that is fixedly connected to an input drive shaft of the transmission mechanism,
    the input drive shaft carrying an interconnected sun gear of said planetary gear set which further has a pinion carrier for pinion gears that is connected to the input drive shaft only when said forward friction disk clutch is operated and which also has a ring gear that is connected to the transmission housing only when said reverse friction disk brake is operated to provide said forward and reverse driving directions, respectively, the adjusting piston of said hydraulic adjusting means being fixedly connected in an axially stationary manner to the adjacently arranged servo cylinder of the servo piston provided for the operation of said forward friction disk clutch, whereby the servo piston is at least partly surrounded by said adjusting cylinder which is fixedly connected to the movable sheave of the primary pulley of said pulley drive.

2. A clutch assembly as in claim 1, wherein the servo cylinder of the servo piston provided for the operation of said forward friction disk cluch and the adjusting piston of said hydraulic adjusting means provided for the primary pulley of the pulley drive are each formed of sheet-metal and fixedly connected to a hub portion of the sun gear of the planetary gear set.

3. A clutch assembly as in claim 1, wherein a hub portion of the sun gear of the planetary gear set forms a shoulder for a hub portion of the movable sheave of the primary pulley of said pulley drive.

4. A clutch assembly as in claim 1, wherein a hollow space is provided inbetween the servo cylinder of the servo piston provided for the operation of said forward friction disk clutch and the adjusting piston of said hydraulic adjusting means which hollow space forms a portion of an oil intake channel leading to said servo piston.

5. A clutch assembly as in claim 4, wherein said hollow space is connected via a bore in a hub portion of the sun gear of said planetary gear set and further bore in the input drive shaft of said pulley drive to an oil intake channel which is formed by a hollow pump drive shaft driven by the pinion carrier of said planetary gear set and arranged within an axial bore of said input drive shaft.

6. A clutch assembly as in claim 5, wherein a circular space is provided by said pump drive shaft with respect to the surrounding input drive shaft of said pulley drive which circular space is connected through a bore in this input drive shaft and through a further bore in a hub portion of the movable sheave of the primary pulley of said pulley drive to an oil intake channel leading to said hydraulic adjusting means.

7. A clutch assembly as in claim 1, wherein the servo cylinder of the servo piston provided for the operation of said reverse friction disk brake is integrally formed on a face wall of a transmission housing.

8. A clutch assembly as in claim 1, wherein the pinion carrier of said planetary gear set is supported by the input drive shaft of said pulley drive by means of a needle roller bearing and is integral with an input shaft of the transmission mechanism that is arranged for a direct axial connection with the driving shaft of the engine of the automobile.

* * * * *